(12) United States Patent
Hwang et al.

(10) Patent No.: US 6,958,499 B2
(45) Date of Patent: Oct. 25, 2005

(54) TRIODE FIELD EMISSION DEVICE HAVING MESH GATE AND FIELD EMISSION DISPLAY USING THE SAME

(75) Inventors: Chi-Sun Hwang, Daejon (KR); Yoon-Ho Song, Daejon (KR); Bong-Chul Kim, Daejon (KR); Choong-Heui Chung, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 152 days.

(21) Appl. No.: 10/675,178

(22) Filed: Sep. 30, 2003

(65) Prior Publication Data

US 2004/0115870 A1   Jun. 17, 2004

(30) Foreign Application Priority Data

Dec. 11, 2002   (KR) ...................... 10-2002-0078885
Mar. 10, 2003   (KR) ...................... 10-2003-0014782

(51) Int. Cl.$^7$ ......................................... H01L 27/148
(52) U.S. Cl. ...................... 257/245; 257/202; 257/204; 257/213; 257/236; 313/309; 313/310; 313/311; 977/1
(58) Field of Search ............................... 257/202, 204, 257/213, 236, 245; 313/309, 310, 311; 977/1

(56) References Cited

U.S. PATENT DOCUMENTS

| | | | |
|---|---|---|---|
| 5,332,627 A | * | 7/1994 | Watanabe et al. ........... 428/426 |
| 5,817,201 A | | 10/1998 | Greschner et al. |
| 6,437,503 B1 | | 8/2002 | Konuma |
| 6,515,415 B1 | * | 2/2003 | Han et al. ................... 313/496 |

FOREIGN PATENT DOCUMENTS

| | | |
|---|---|---|
| JP | 04-167326 | 6/1992 |
| KR | 1020010010234 | 2/2001 |
| KR | 1020010037212 | 5/2001 |

OTHER PUBLICATIONS

Applied Physics Letters, vol. 78, No. 11, Mar. 12, 2001, pp. 1547-1549.
Applied Physics Letters, vol. 78, No. 9, Feb. 26, 2001, pp. 1294-1296.

* cited by examiner

*Primary Examiner*—Christian Wilson
*Assistant Examiner*—Douglas Menz
(74) *Attorney, Agent, or Firm*—Blakely, Sokoloff, Taylor & Zafman

(57) ABSTRACT

Provided is a field emission device having a mesh gate. The object of this research is to provide a field emission display (FED) using a triode field emission device for preventing increase of operation voltage, and securing high concentration of electron beams. The operation properties of the FED is different based on a structure of an extraction electrode. In this research, the extraction electrode is formed on the electron emitting source and it has a plurality of openings corresponding to the locations of carbon nanotube mixture. The concentration of the electron beams is raised and leakage current is suppressed by using an insulating mesh gate plate. The upper part of the openings has a smaller diagram than the lower part. The high concentration of electron beams and little leakage current can be generated by adding auxiliary electrodes or optimizing the shape of electrodes.

7 Claims, 13 Drawing Sheets

TRIODE FIELD EMISSION DEVICE HAVING MESH GATE AND FIELD EMISSION DISPLAY USING THE SAME

FIELD OF THE INVENTION

The present invention relates to a field emission device; and, more particularly, to a triode field emission device having a mesh gate.

DESCRIPTION OF RELATED ART

A field emission display (FED) has come into the spotlight as a next-generation display which has the advantages of a cathode-ray tube (CRT) and liquid crystal display (LCD). Many researches have been actively progressed in order to develop FED technology. A field emission device uses the principle that electrons are field-emitted from fine tips. The FED is constructed with FED which is field-emitted by electrons from fine tips. Among various types of field emission devices, a triode field emission device is used most popularly. Triode field emission devices are used for electron guns and amplifiers as well as FEDs.

The basic theory of FED is based on vacuum microelectronics. The biggest advantage of vacuum microelectronics is that electrons are field-emitted in vacuum, which is different from conventional vacuum tube devices. Based on this theoretical background, Dr. Spindt found that the field-emission is greatly enhanced, when fine metal tips are used, which are called Spindt cathode theory, and the basic theory of FED is completed by the spindt cathode theory.

FED consists of an anode plate panel and a cathode plate panel. In FED, an image is displayed as the electrons emitted from the cathode plate collide against the fluorescent substances of the anode plate. The cathode plate panel of FED is formed of micro field emitter array (FEA) that emits electrons. The anode plate panel of FED is deposited with fluorescent substances and provides visible images for viewers.

FIG. 1 is a cross-sectional view showing a Spindt type of triode field emission device according to a prior art. Referring to FIG. 1, the conventional Spindt type of triode field emission device includes: a bottom electrode 102, i.e., a cathode, and a resistance layer 103 deposited sequentially on an insulation substrate 101; an insulation layer 104 and an extraction electrode 105 which are having a plurality of openings and deposited on the resistance layer 103 sequentially; and a cathode plate panel formed of field emitters positioned within the openings formed in the insulation layer 104 and the extraction electrode 105, i.e., a gate. An FED using a conventional Spindt type of triode field emission device includes an anode plate panel provided with a top electrode 108, i.e., an anode, and a transparent substrate 109. The anode plate panel and the cathode plate panel are apart from each other by a predetermined space with a spacer 107 in-between. If the triode field emission device is applied to FED, a fluorescent substance is deposited on the surface of the top electrode 108.

The conventional Spindt type of triode field emission device is fabricated by forming openings not more than 1 µm on the insulation layer 104, forming a sacrificial layer thereon, and forming the field emitters 106 in a self-alignment method by performing electron beam deposition. In this case, it is difficult to form fine patterns, and since self-alignment method using the electron beam deposition is used, it can hardly be applied to FED, which aims to be embodied as a large area display.

For this reason, there has been an effort to manufacture wide area FED in an easier method. One of the materials suitable for this purpose is carbon nanotube. Carbon nanotube has a small diameter not more than nm unit, but it has a length of µm unit. This is a structure adequate for emitting electrons.

FIG. 2 is a cross-sectional view showing a triode field emission device using a carbon nanotube according to a prior art. Referring to FIG. 2, a triode field emission device using a conventional carbon nanotube includes: an insulation substrate 201, a bottom electrode 202, i.e., a cathode, a resistance layer 203, an insulation layer 204, an extraction electrode 205, i.e., a gate, a carbon nanotube mixture 206, a spacer 207, a top electrode 208, an anode, and a transparent substrate 209. The triode field emission device of FIG. 2 is different from the field emission device of FIG. 1 in that the field emitters 106 are replaced with the carbon nanotube mixture 206. Except that, all other elements are the same.

The triode field emission device using the conventional carbon nanotube is fabricated by mixing the carbon nanotube with a binder material, and putting the mixture inside the openings, which are formed in advance. However, if the carbon nanotube is used as a source for field-emitting electrons actually, the triode field emission device should have a triode electrode structure to lower the operation voltage. Therefore, it is hard to form the extraction electrode in the self-alignment method, compared to the Spindt type of field-emitter array illustrated in FIG. 1.

In addition, in the triode field emission device using the conventional carbon nanotube, leakage current is produced frequently, as the electrons emitted from the carbon nanotube flow into the extraction electrode 205. Also, when the emitted electron beams arrive at the top electrode 208, they spread out widely, compared to the moment they are emitted. This phenomenon impedes the characteristics of the field emission device. Particularly, it may be led to a big problem when it is applied to FED.

FIG. 3 is a cross-sectional view showing a triode field emission device using a carbon nanotube according to another prior art. Referring to FIG. 3, a field emission device includes; a insulation substrate 301, an extraction electrode 302, i.e., a gate, an insulation layer 303, a bottom electrode 304, i.e., a cathode, a carbon nanotube mixture 305, a spacer 306, a top electrode 307, i.e., an anode, and a transparent substrate 308. When it is compared with the field emission device of FIG. 2, there is no change in the anode plate panel, but in the cathode plate panel, the location of the electrodes are changed. The cathode plate includes the extraction electrode 302 and the insulation layer 303 on the insulation substrate 301, the bottom electrode 304 in the upper part of the insulation layer 303, and the carbon nanotube mixture 305 formed on the bottom electrode 304.

In the field emission device illustrated in FIG. 3, the extraction electrode 302 is located in the lower part of the carbon nanotube mixture 305. In this case, it is possible to prevent the electrons emitted from the carbon nanotube from flowing into the extraction electrode 302. However, in actual operation, the difference between the on/off states is not distinctive, and the driving voltage increases, compared to the field emission device illustrated in FIG. 2.

SUMMARY OF THE INVENTION

It is, therefore, an object of the present invention to provide a field emission display (FED) using a triode field emission device, which uses a carbon nanotube, for preventing the increase of operation voltage and leakage current, and securing high concentration of electron beams.

In accordance with an aspect of the present invention, there is provided a triode field emission device using a carbon nanotube, including: a bottom electrode formed on an insulation substrate; an array of carbon nanotube mixture formed on the bottom electrode; an insulating mesh gate plate having a plurality of openings corresponding to the locations of the carbon nanotube mixture, the upper part of the openings being smaller than the lower part; an extraction electrode formed on the insulating mesh gate plate; a top electrode formed apart from the extraction electrode with a predetermined space in between; and a first spacer formed between the extraction electrode and the top electrode.

In accordance with another aspect of the present invention, there is provided a field emission display, including: an insulation substrate; a bottom electrode formed on the insulation substrate; an array of carbon nanotube mixture provided on top of the bottom electrode; an insulating mesh gate plate having a plurality of openings corresponding to the locations of the carbon nanotube mixture, the upper part of the openings being smaller than the lower part; an extraction electrode formed on the insulating mesh gate plate; a top electrode formed apart from the extraction electrode with a predetermined space in between; and a spacer formed between the extraction electrode and the top electrode; a fluorescent substance provided to the surface of the top electrode; and a transparent substrate provided to the upper part of the top electrode.

The field emission device using a carbon nanotube should use a triode electrode structure to maintain low operation voltage. The operation characteristics of the field emission device are different based on the structure of the extraction electrode formed with respect to a source emitting electrons. In the present invention, the extraction electron is provided on top of the electron emitting source. It has a plurality of openings corresponding to the carbon nanotube mixture array. By using an insulating mesh gate plate where the upper part of the openings has a smaller diameter than the lower part, the concentration of the emitted electron beams is heightened and the generation of leakage current is suppressed. The high concentration of the electron beams and the generation of little leakage current can be achieved by adding auxiliary electrodes or optimizing the form of the electrodes.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
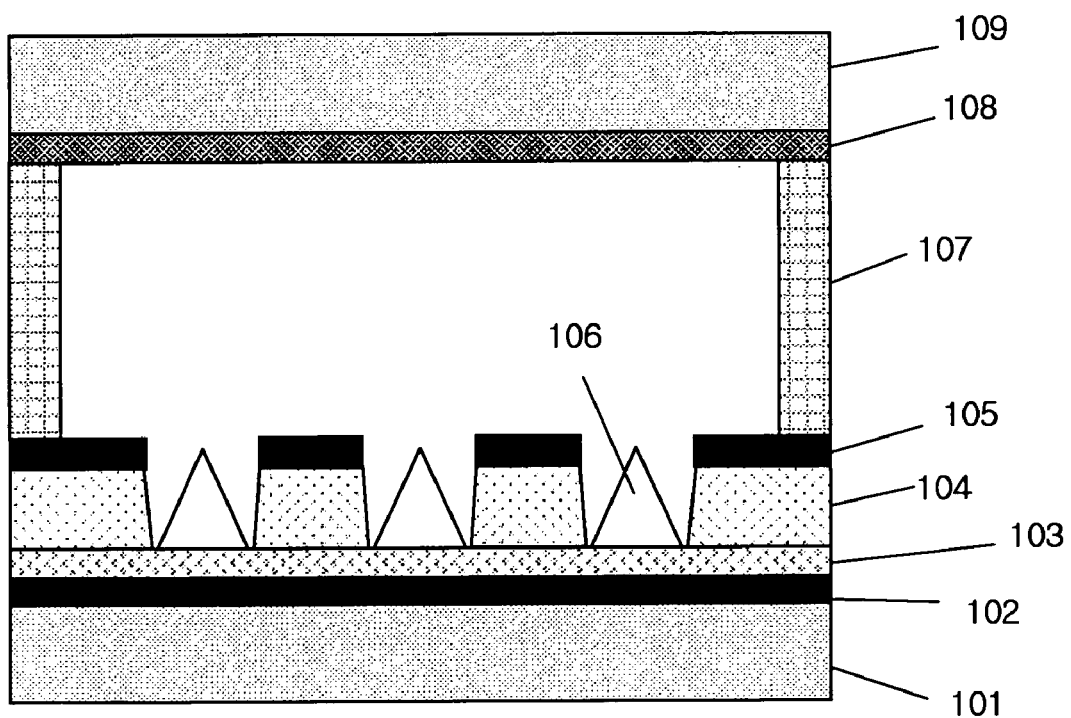
FIG. 1 is a cross-sectional view showing a Spindt type of triode field emission device according to a prior art.
Figure 2:
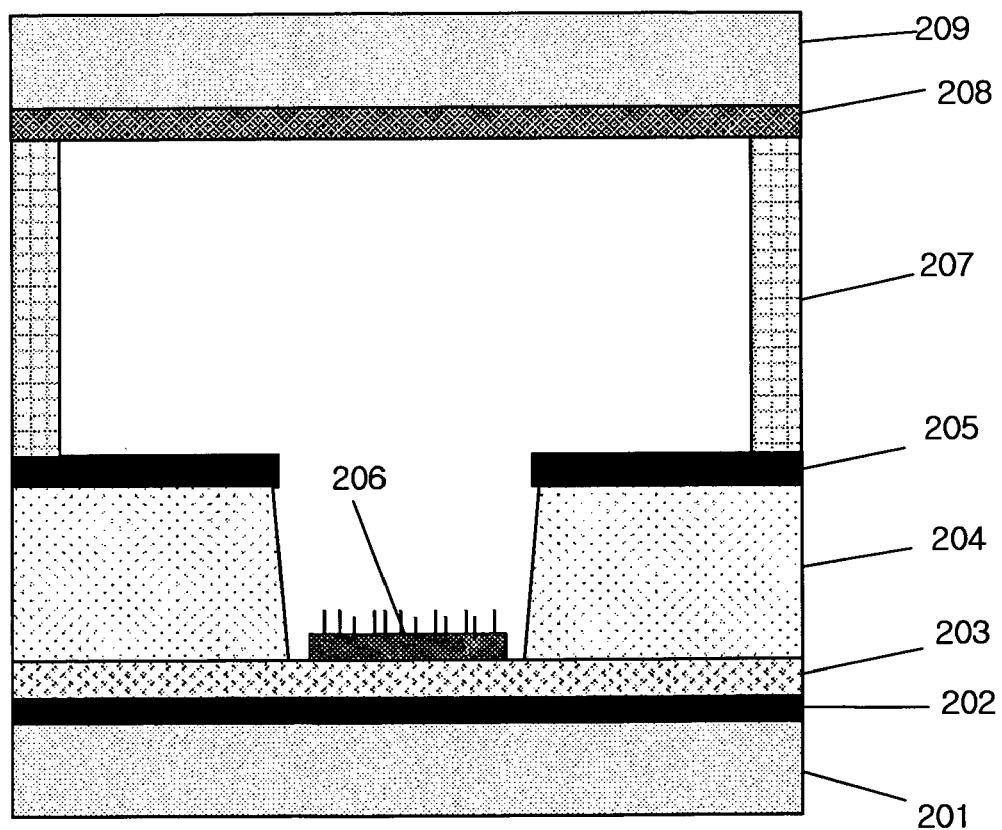
FIG. 2 is a cross-sectional view showing a triode field emission device using a carbon nanotube according to a prior art.
Figure 3:
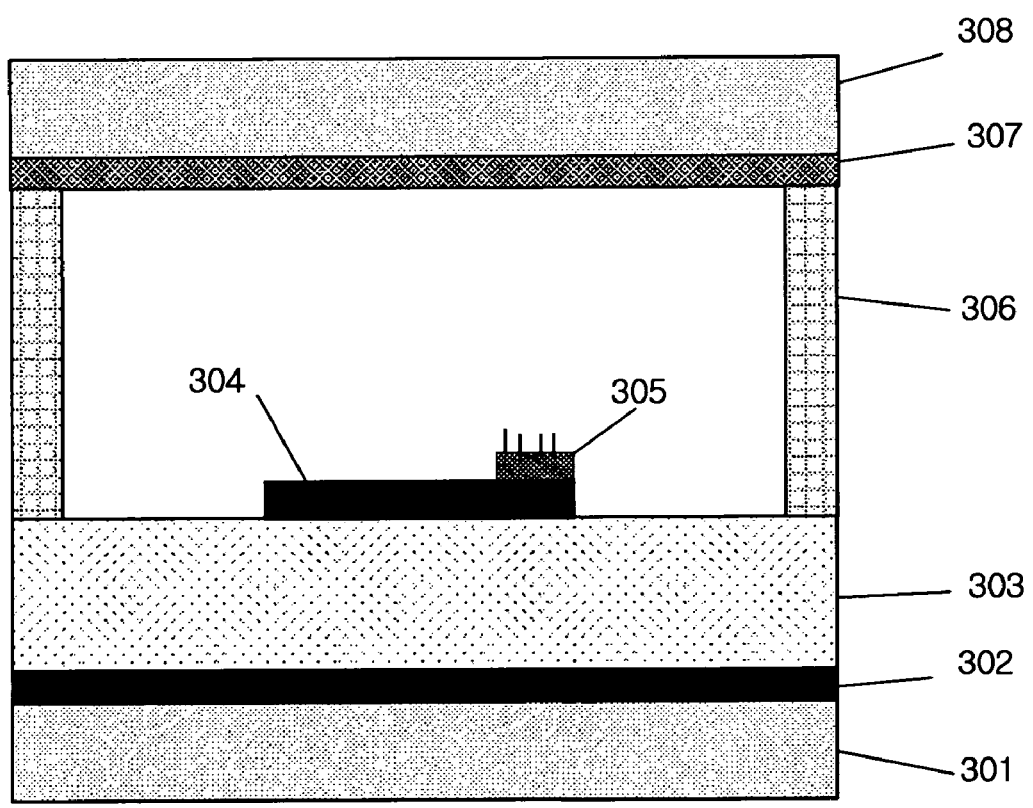
FIG. 3 is a cross-sectional view showing a triode field emission device using a carbon nanotube according to another prior art.
Figure 4:
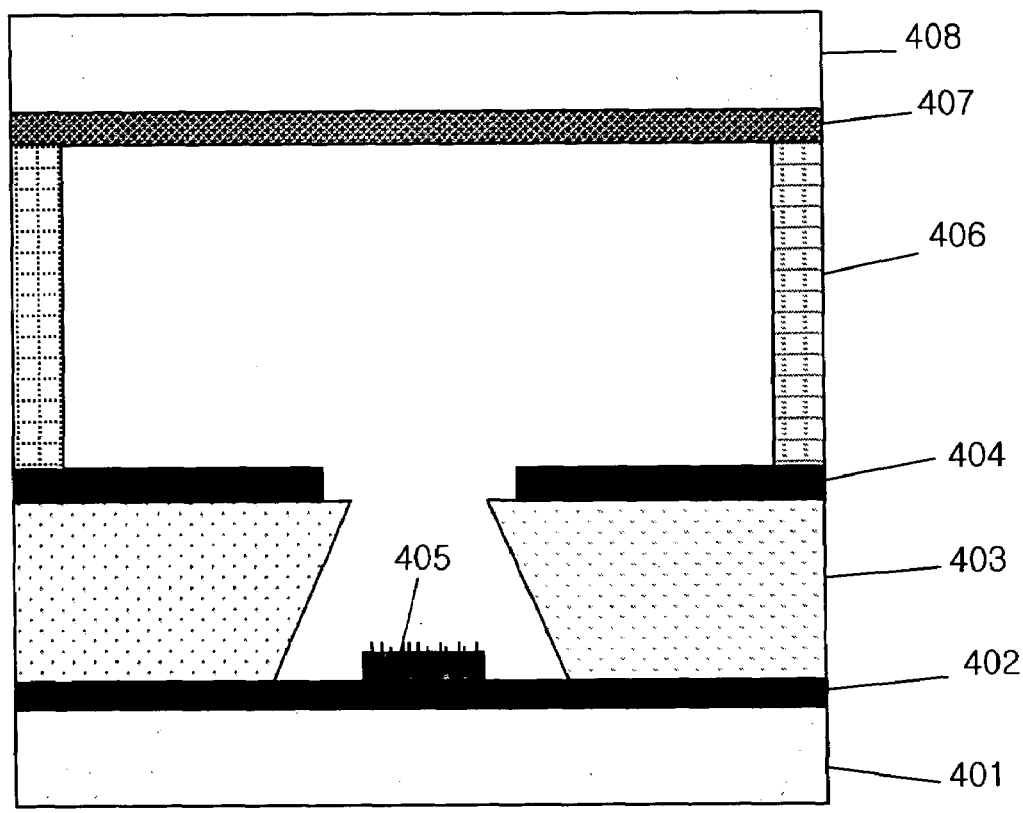
FIG. 4 is a cross-sectional view illustrating a triode field emission device using a carbon nanotube in accordance with a preferred embodiment of the present invention.

FIG. 4 is a cross-sectional view illustrating a triode field emission device using a carbon nanotube in accordance with an embodiment of the present invention. Referring to FIG. 4, a triode field emission device using a carbon nanotube of the present invention includes: a bottom electrode 402, i.e., a cathode, provided on an insulation substrate 401; a carbon nanotube mixture 405 provided to the bottom electrode 402 in the form of lattice having a predetermined space; an insulation mesh gate plate 403 having a plurality of openings corresponding to the locations of the carbon nanotube mixture 405, the upper part of the opening having a smaller diameter than that of the lower part; an extraction electrode 404, i.e., a gate, provided to the upper surface of the mesh gate plate 403; a spacer 406 provided on top of the extraction electrode 404 in the vertical direction; and an anode plate panel apart from the cathode plate panel by a predetermined space with the spacer 406 in between. The anode plate panel includes a top electrode 407, i.e., an anode electrode, and a transparent substrate 408 provided thereon. If the anode plate panel is to be applied to a field emission display (FED), the surface of the top electrode 407 is deposited with a fluorescent substance.

Hereinafter, a method for fabricating a triode field emission device is described in accordance with an embodiment of the present invention.

First, the bottom electrode 402 is formed by providing a conductor or metal on the insulation substrate 401 formed of an insulator or glass. On the bottom electrode 402, the carbon nanotube mixture 405, which is obtained by mixing a carbon nanotube and a binder, is deposited by using a screen printing method.

The mesh gate plate 403 is formed of an insulator or glass having a thickness of hundreds of $\mu$m. The mesh gate plate 403 has openings in the locations to be occupied by the carbon nanotube mixture 405. Here, the upper part of the openings in the mesh gate plate 403 has a smaller diameter than the lower part.

Subsequently, the extraction electrode 404 is formed by depositing a conductor or a metal thin film 404 on the mesh gate plate 403. Since the extraction electrode 404 is formed on the mesh gate plate 403, it also has a form of mesh.

The mesh gate plate 403 wherein the extraction electrode 404 is formed is placed on the cathode electrode 402 wherein the carbon nanotube mixture 405 is formed with the openings of the mesh gate plate 403 corresponding to the carbon nanotube mixture 405.

Subsequently, the spacer 406 for vacuum sealing is formed on the extraction electrode 404. Then, the top electrode 407, i.e., the anode, with the fluorescent substance deposited thereon and the transparent substance 408 formed of a transparent insulator or glass are placed on the spacer 406, and then vacuum sealing is performed. In case where FED is fabricated, a step of depositing a fluorescent substance on the surface of the top electrode 407 is added. To the bottom electrode 402 of the FED fabricated as above, low voltage or ground voltage is connected. Then, an electric field is formed by supplying a proper level of voltage (not more than several hundred volts (V)) to the extraction electrode 404 and, as a result, electrons are emitted from the carbon nanotube. Images can be displayed on the FED by applying a high voltage (several kV) and exciting the fluorescent substances by accelerating the emitted electrons.

Figure 5A:
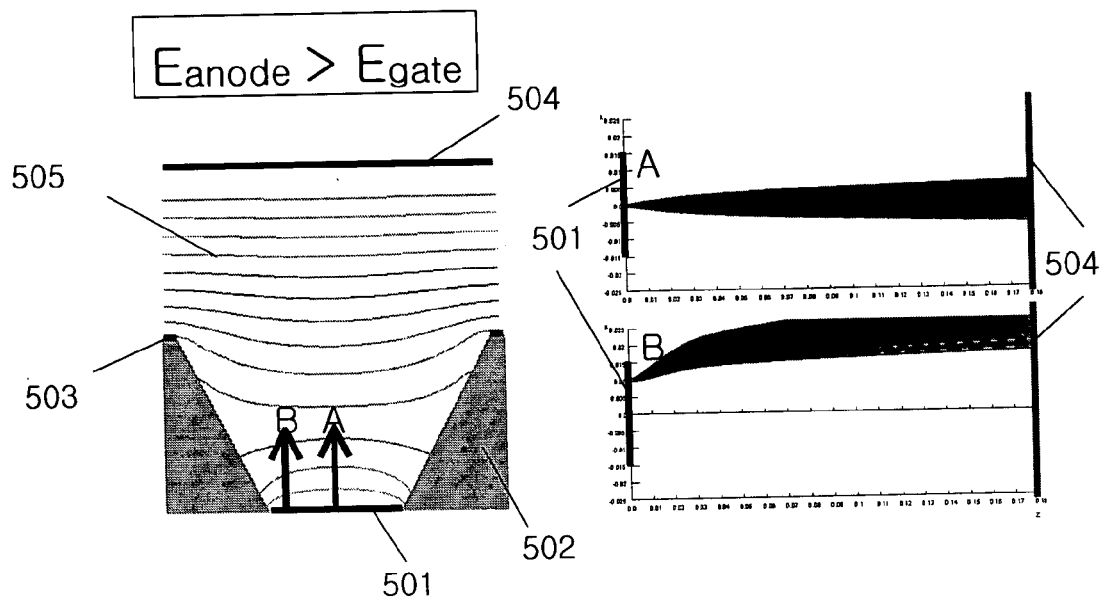
FIGS. 5A to 5I are diagrams describing electron emission characteristics according to a structure of each mesh gate plate.
Figure 5A:
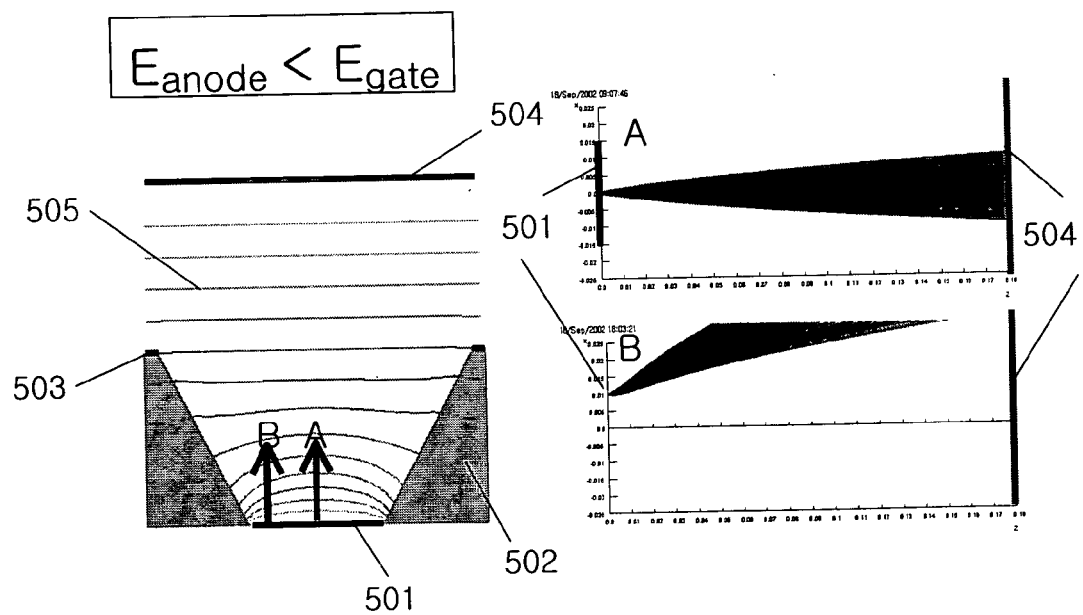

FIGS. 5A to 5I are diagrams describing electron emission characteristics according to a structure of each mesh gate plate. FIG. 5A shows a conventional technology where the upper part of the openings formed on the mesh gate plate has a larger diameter than the lower part. To simplifying the drawing, only a cathode 501, an insulator 502, a gate 503, i.e., an extraction electrode, and an anode 504 are illustrated. FIG. 5A also shows the equi-potential lines 505. The upper drawing shows a case where electric field of Eanode of the anode 504 is smaller than the electric field Egate by the gate 503. The drawing in the lower part shows the opposite case. FIG. 5A shows that the electron beams emitted from the center A and the outskirt B of the openings of the mesh gate plate are spread out widely. This can be easily known from the shapes of the equi-potential lines 505. The equi-potential lines 505 rise upward around the cathode 501 which is a surface for emitting electrons. From this shape, it can be seen that the electrons departing from the cathode 501 would go out diverged from each other. Particularly, this phenomenon appears more intensely among the electrons emitted around the outskirt B. This makes the risk of leakage current to the gate 503 larger.

Figure 5B:
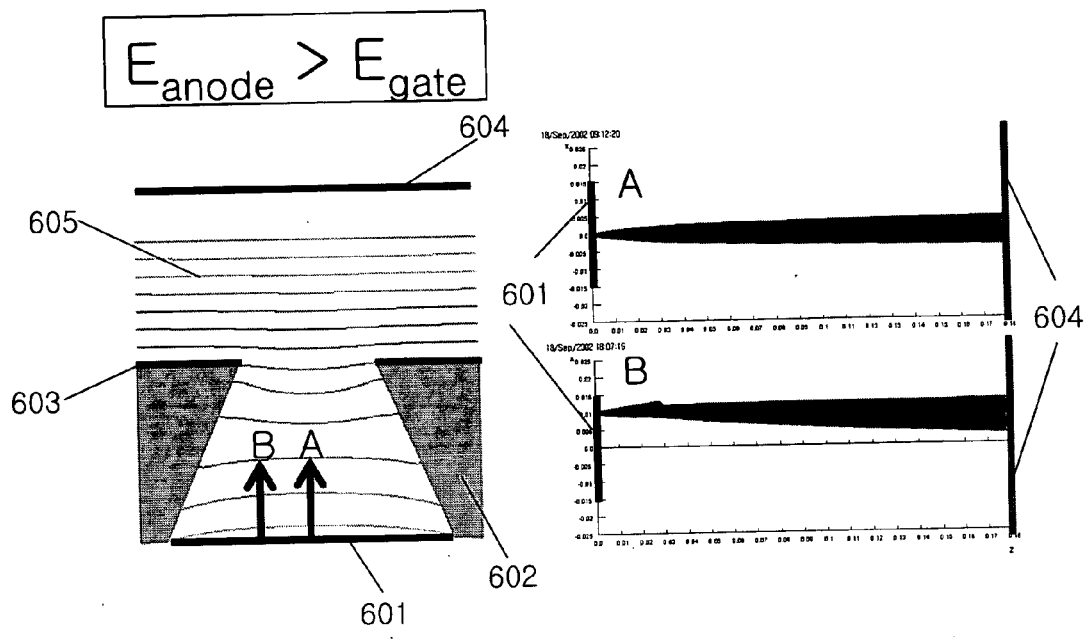
Figure 5B:
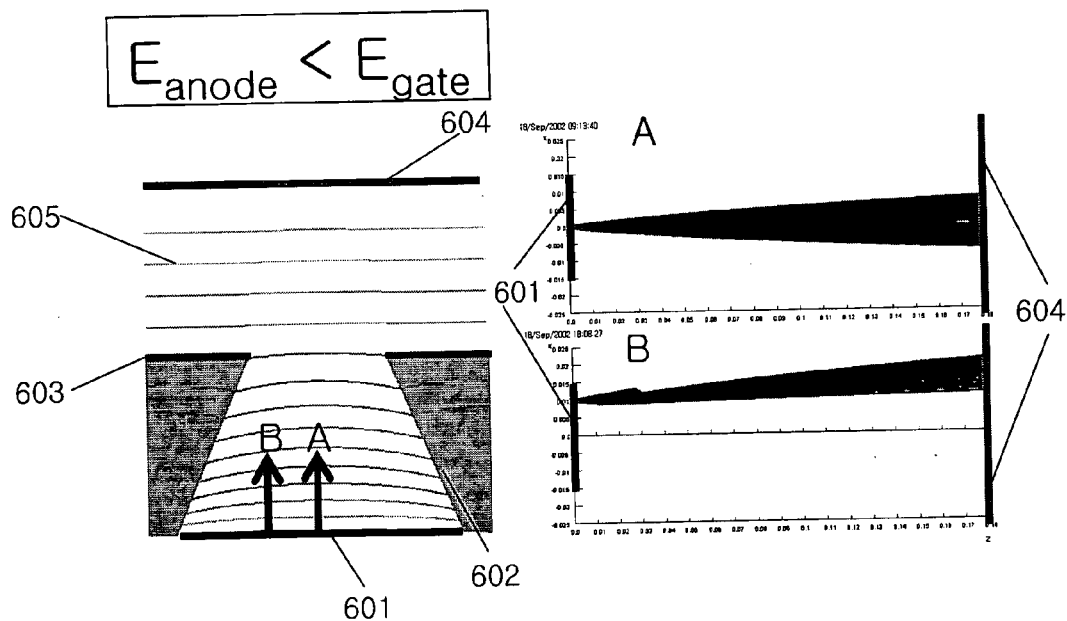

Referring to FIG. 5B, the upper part of the openings has a smaller diagram than the lower part. The equi-potential lines 605 of FIG. 5B show that the rise around the cathode 601 is reduced a lot, compared to the equi-potential lines 505 of FIG. 5A. As a result, the extent of electron beam spread is considerably reduced, and the tendency of the electron beams being getting out toward the gate 603 is reduced remarkably. The undescribed reference numeral 604 denotes an anode.

Figure 5C:
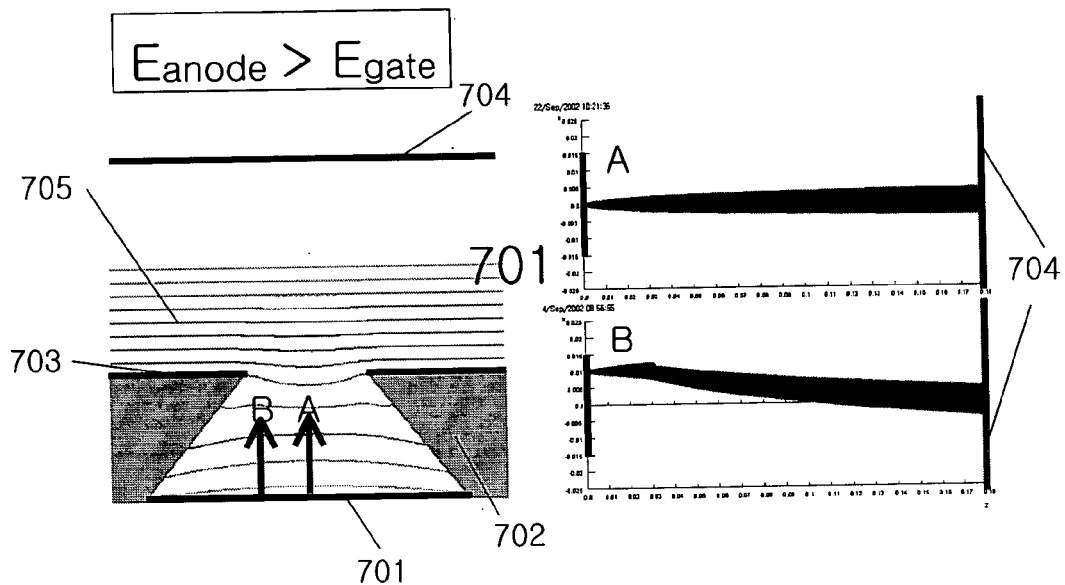
Figure 5C:
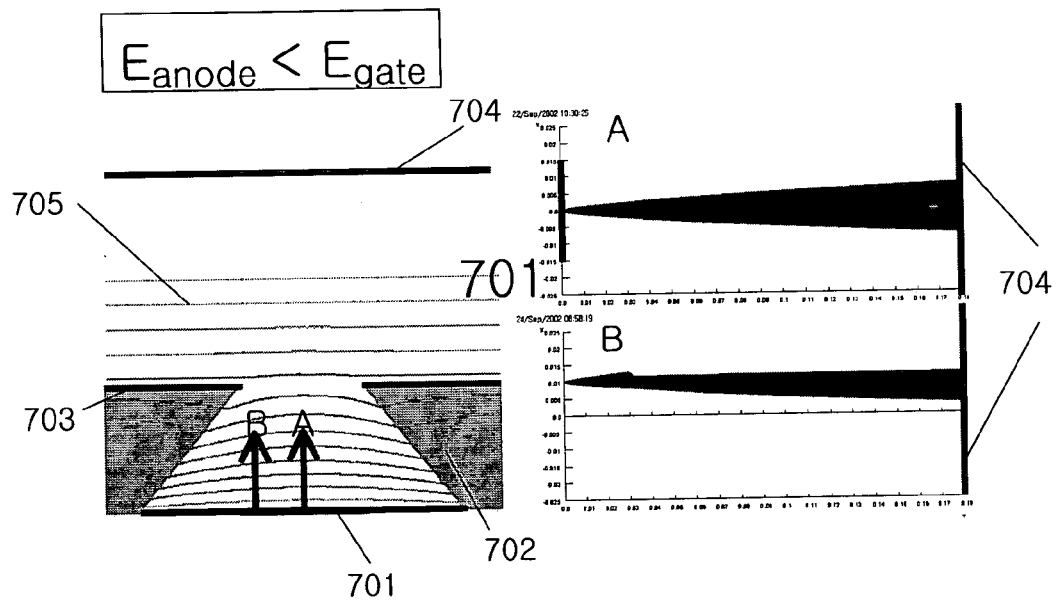

FIGS. 5C to 5I show examples of the shape of the openings modified based on the shape of the openings illustrated in FIG. 5B. Referring to FIG. 5C, the diameter of the lower part of the openings formed in the mesh gate plate 702 is larger than the upper part. In this case, the extent of the rise around the cathode 701 is reduced much more and, as a result, there is an effect that the more electron beams are concentrated on the central part. The undescribed reference numerals 703 and 704 denote a gate and an anode, respectively.

Figure 5D:
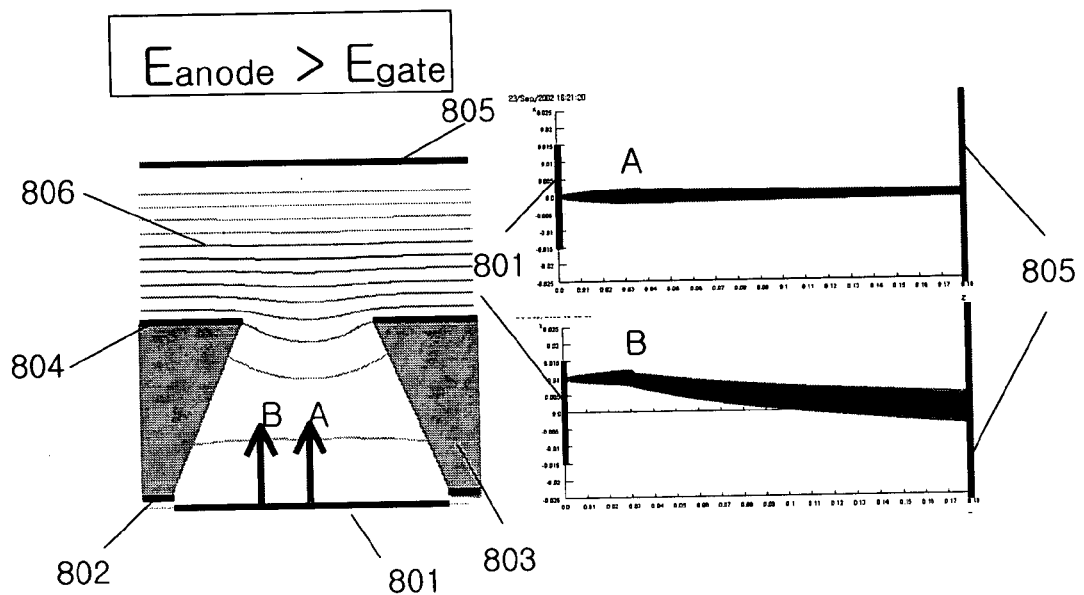
Figure 5D:
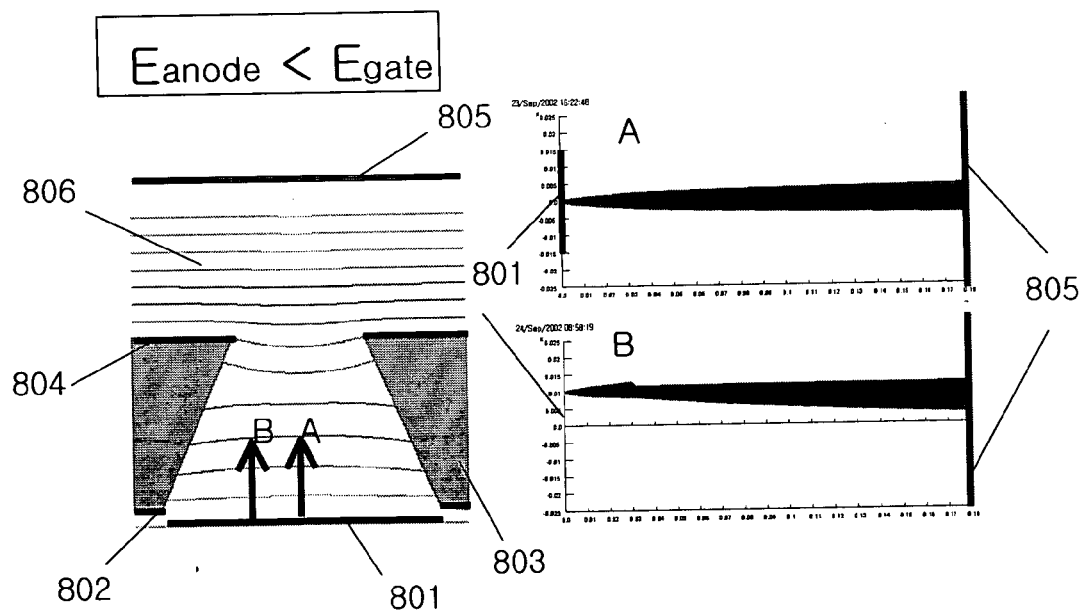

Referring to FIG. 5D, an auxiliary electrode 802 for applying a low level of voltage or ground voltage is provided to the lower part of the mesh gate plate 803 additionally to the structure of FIG. 5C. As shown in FIGS. 5A to 5C, the extent of electron beam concentration is different based on the shape of the equi-potential lines in the region where electrons are emitted, and the amount of leakage current is affected by it, too. The auxiliary electrode added in the structure of FIG. 5D makes the shape of the equi-potential lines 806 a bit more flat. The shape of the electrode beams shows that the electron beams emitted from the central part A are concentrated well. The undescribed reference numerals 801, 804 and 805 denote a cathode, a gate and an anode, respectively.

Figure 5E:
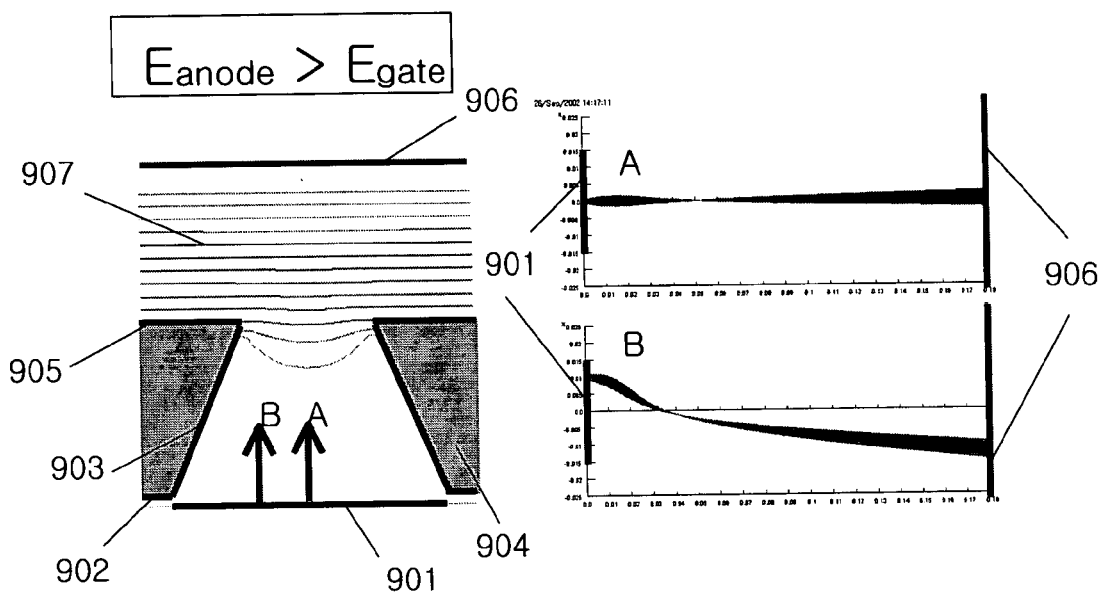
Figure 5E:
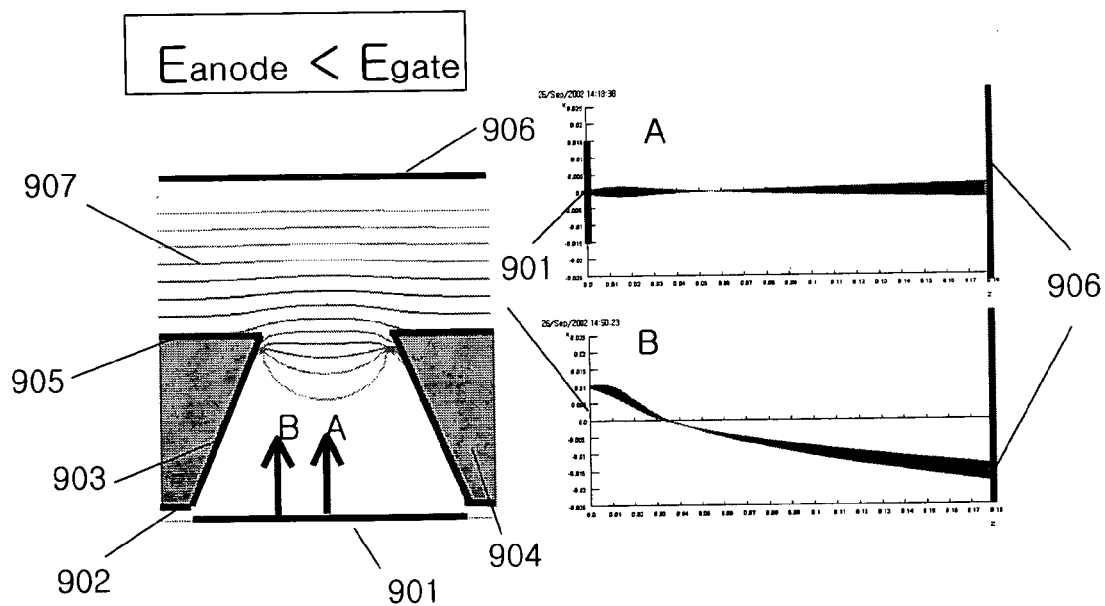

Referring to FIG. 5E, another auxiliary electrode 903 for applying a low level of voltage or ground voltage is provided to the side of the openings of the mesh gate plate 904 in addition to the auxiliary electrode 902 formed in the lower surface of the mesh gate plate 904, which is described in FIG. 5D. Here the auxiliary electrode 902 formed in the lower surface of the mesh gate plate 904 and the auxiliary electrode 903 formed in the side of the openings of the mesh gate plate 904 are connected to each other so that the same voltage can be applied to the two. Also, a separate voltage may be applied to one of them. In the equi-potential lines 907, it is observed that the equi-potential lines always have a sunken-in in the inside of the openings, regardless of the change in the size of the electric field. From this, it can be seen that the electron beams emitted from the outskirt B are concentrated very well. Particularly, little leakage current to the gate 905 is generated. However, since the auxiliary electrode affects the inside of the opening excessively, the electron beams emitted from the outskirt B makes inclination in the opposite direction. The undescribed reference numerals 901 and 906 denote a cathode and an anode, respectively.

Figure 5F:
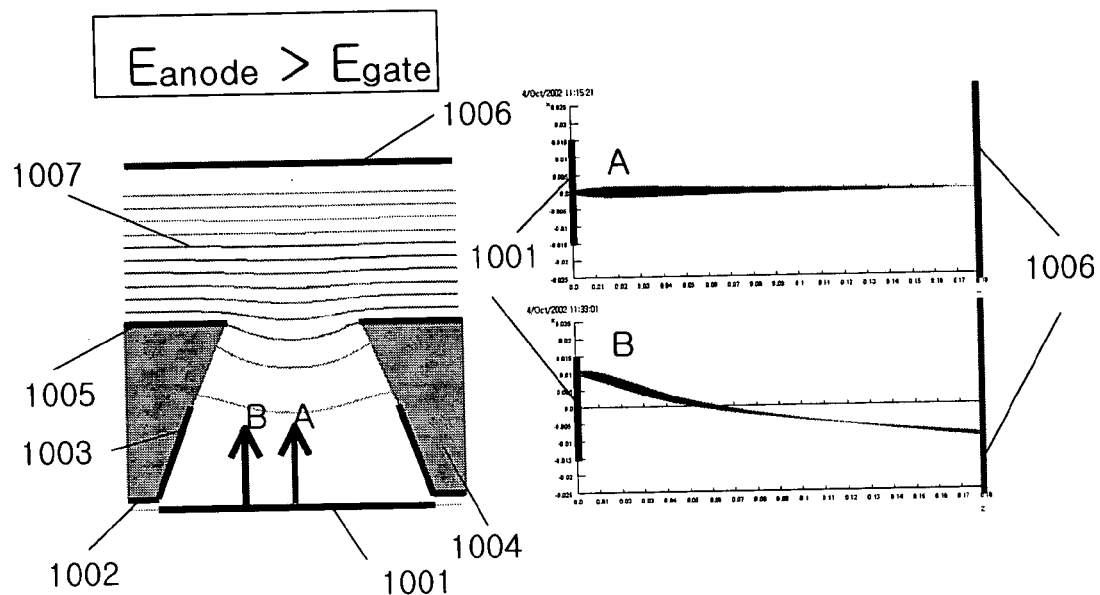
Figure 5F:
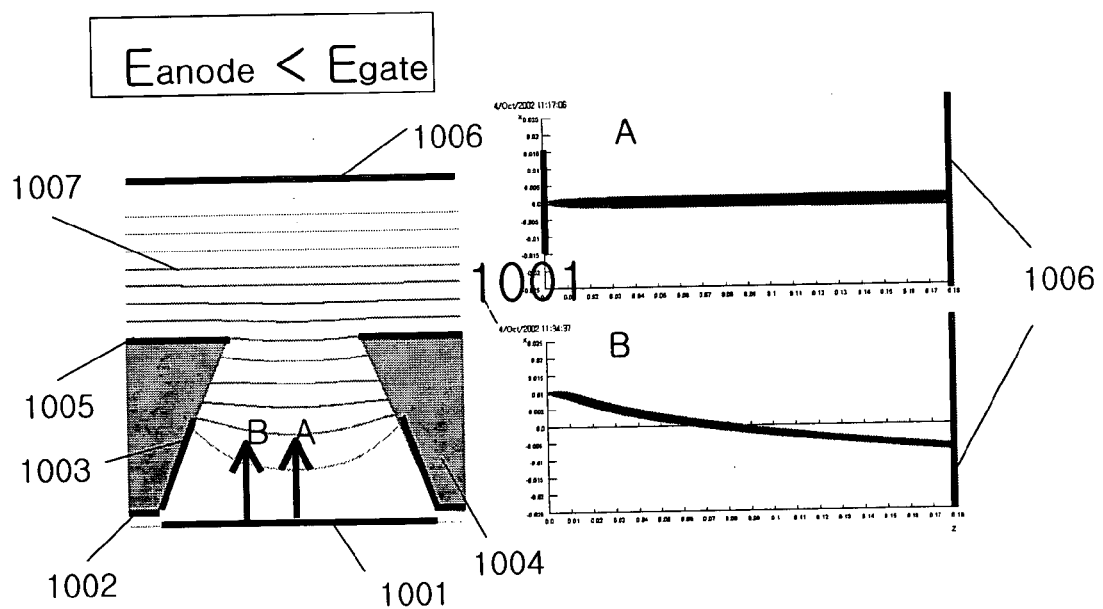
Figure 5G:
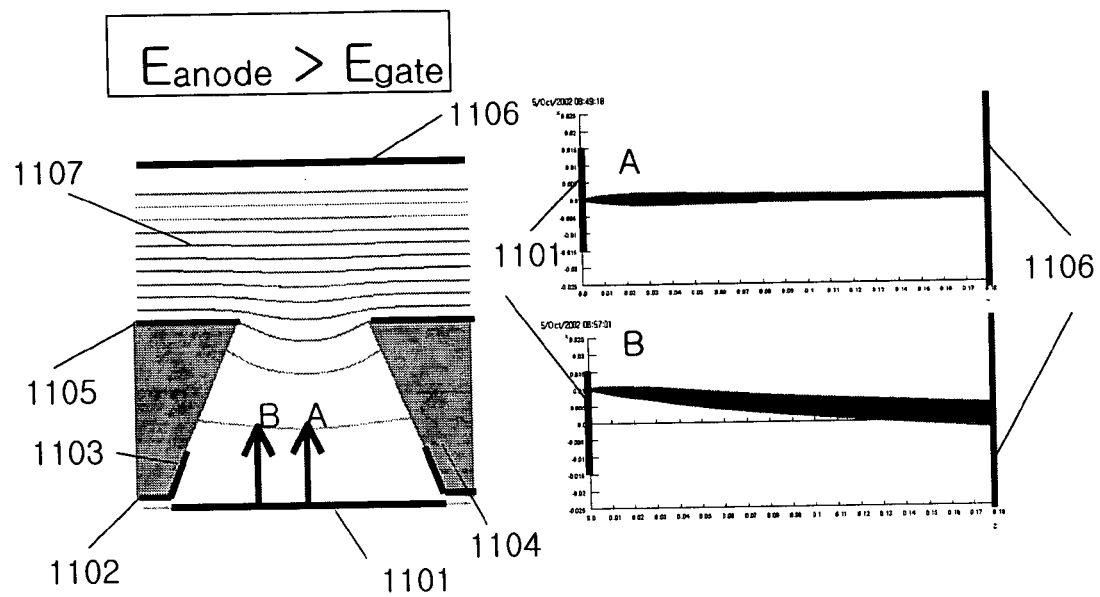
Figure 5G:
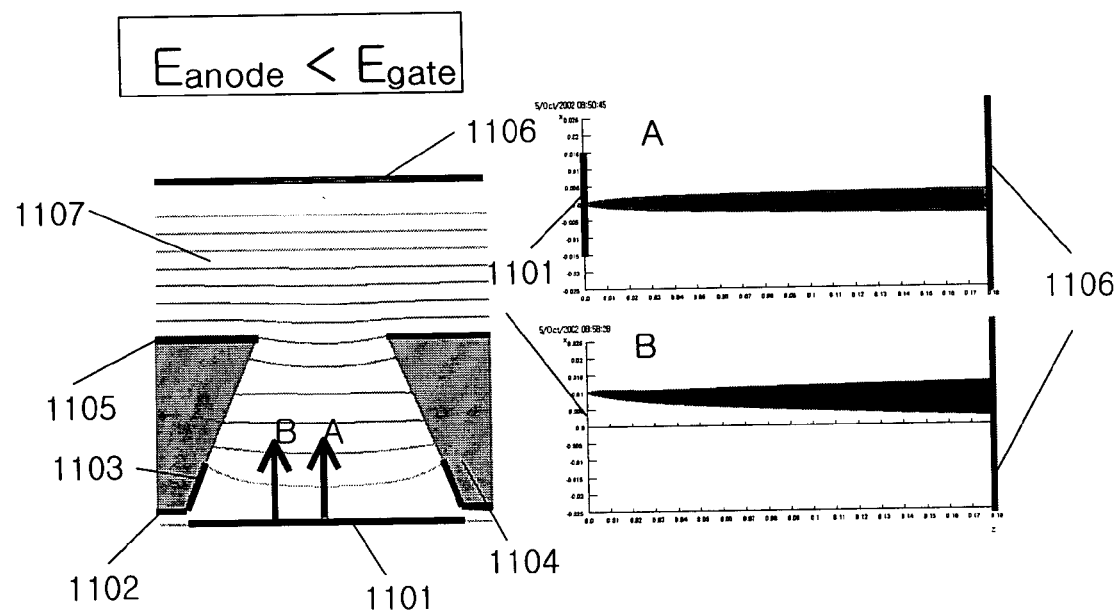

Referring to FIGS. 5F and 5G, the length of the auxiliary electrode formed inside the openings of the mesh gate plates 1004 and 1104 is controlled to reduce the inclination of electron beams shown in FIG. 5E. In FIG. 5F, the auxiliary electrode 1003 is placed at a position half the height of the entire opening. In FIG. 5G, the auxiliary electrode 1103 is positioned at a level a quarter of the height of the entire opening. As a result, in FIG. 5G, all the electron beams emitted from the central part A and the outskirt B make inclination toward the central part. As shown in this result, it is possible to prevent emitted electron beams from making inclination by controlling the height of the auxiliary electrodes 1003 and 1103 properly inside the openings. The proper heights of the auxiliary electrodes 1003 and 1103 may be different based on the level of supplied power voltage. The undescribed reference numerals 1001 and 1101 denote cathodes; 1002 and 1102, bottom electrodes of the mesh gate plate; 1005 and 1105, gates; 1006 and 1106, anodes; and 1007 and 1107, equi-potential lines, respectively.

Figure 5H:
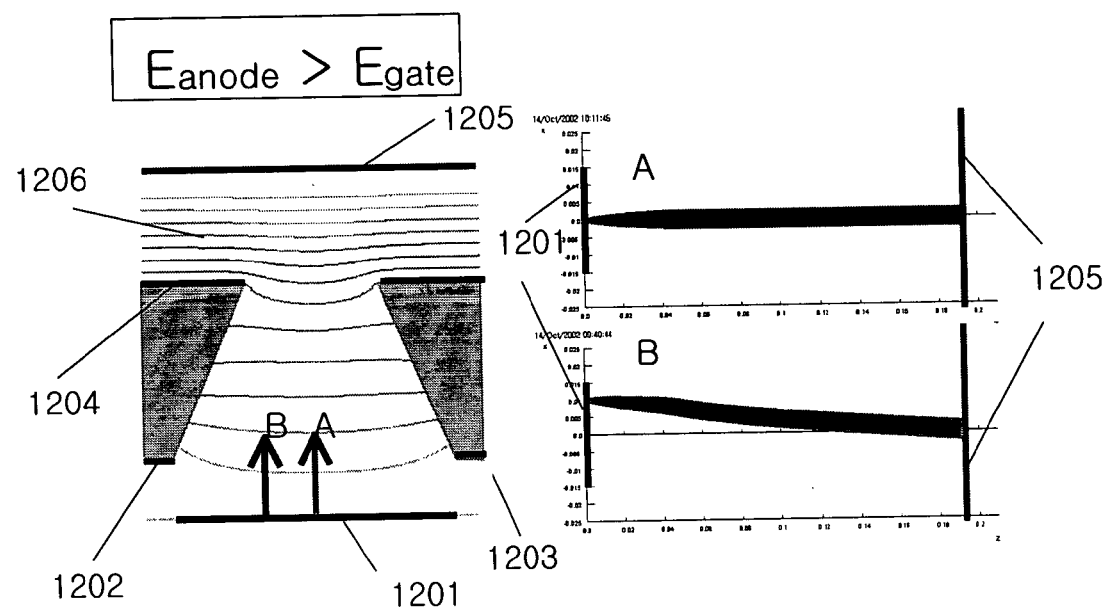
Figure 5H:
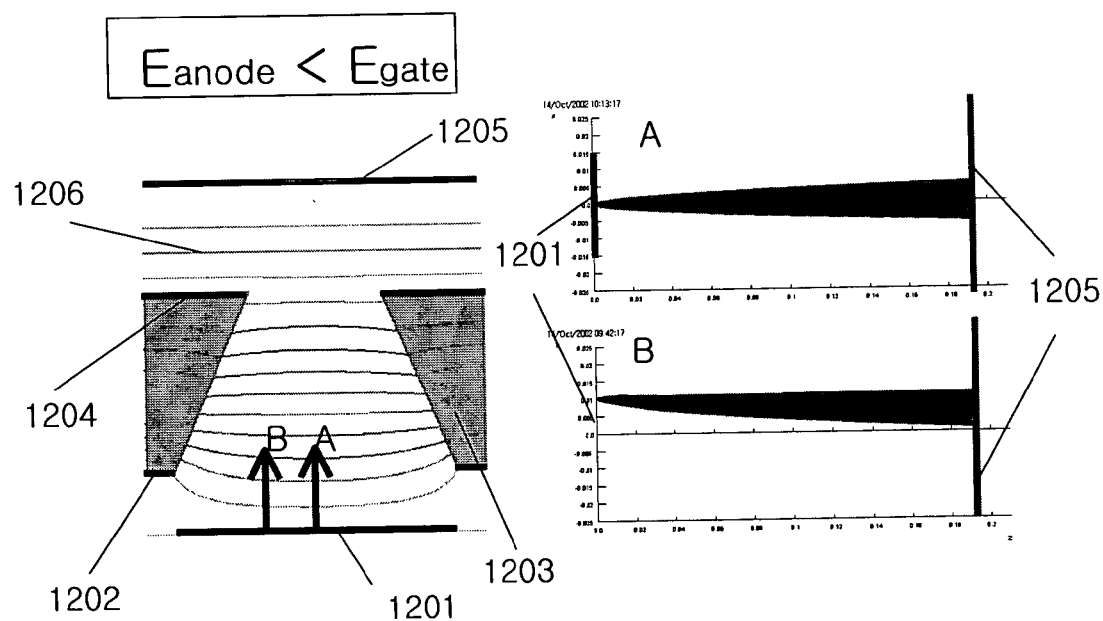
Figure 5I:
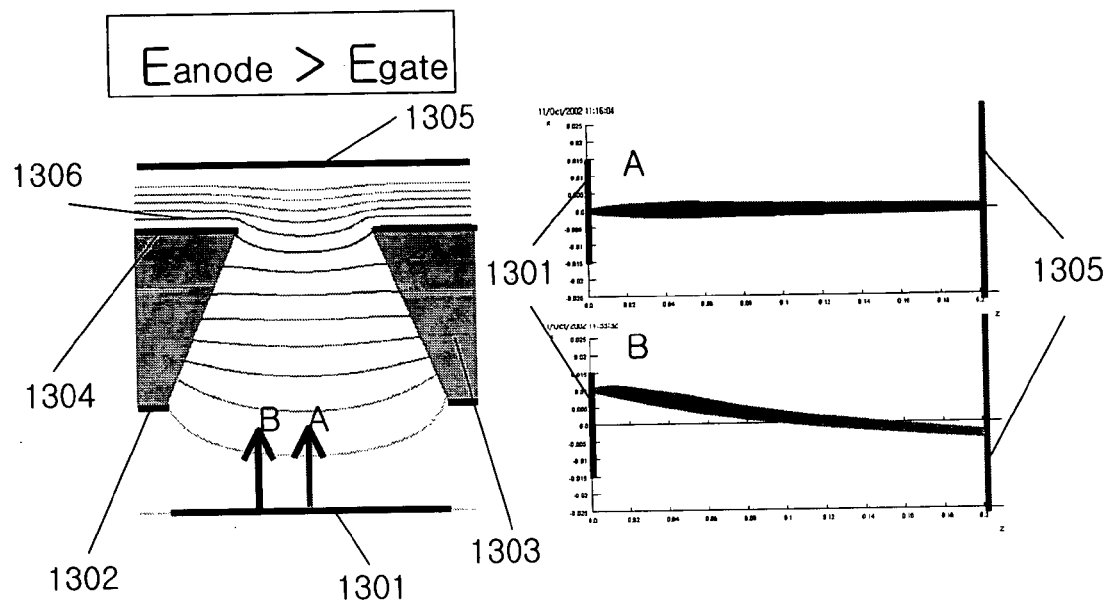
Figure 5I:
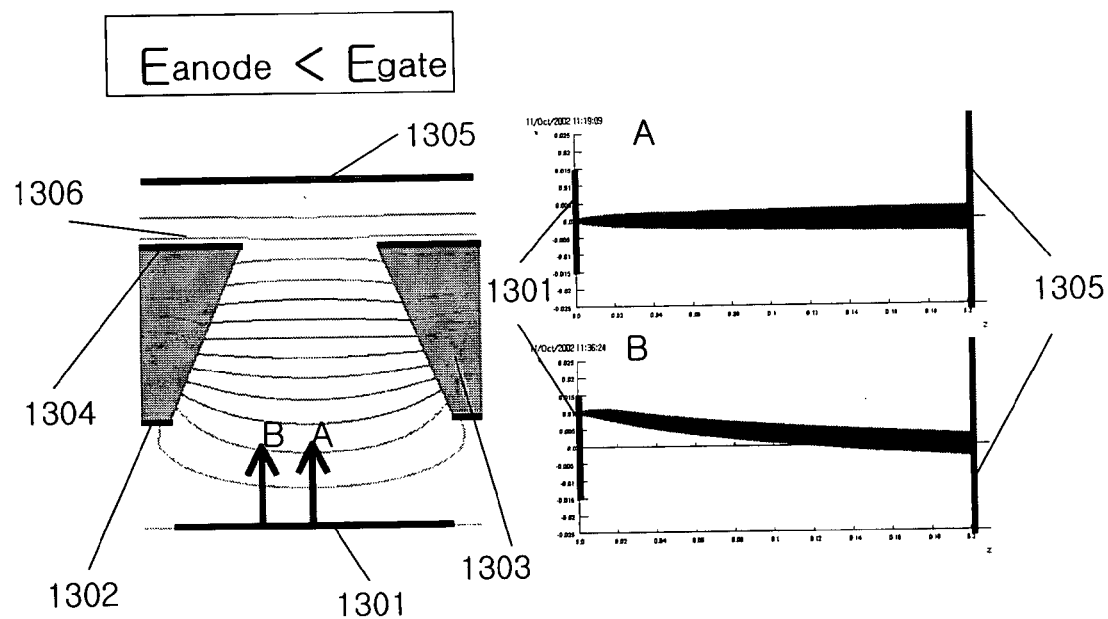

Referring to FIGS. 5H and 5I, shapes of electron beams based on the locations of the mesh gate plates 1203 and 1303 and the cathodes 1201 and 1301 are shown. Since the auxiliary electrodes 1201 and 1302, to which a low level of voltage of a ground voltage is applied, are placed in the lower part of the mesh gate plates 1203 and 1303, the shape of the equi-potential lines 1206 and 1306 in a location where electrons are emitted is changed based on the heights of the auxiliary electrodes 1202 and 1302. In consequences, the equi-potential lines 1206 and 1306 of FIG. 5I show deeper sunken-in than those of FIG. 5H. This means that the case of FIG. 5I has superior electron beam concentration to that of FIG. 5H. A spacer may be provided in the lower part of the mesh gate plates 1203 and 1303 to space out the auxiliary electrodes 1202 and 1302 and the cathodes 1201 and 1301. Of course, it is possible to form auxiliary electrode on the side of the openings of the mesh gate plates 1203 and 1303, too. The undescribed reference numerals 1204 and 1304 denote gates; 1205 and 1305, anodes; and 1206 and 1306, equi-potential lines, respectively.

The technology of the present invention can reduce the amount of leakage current which is pointed as a problem of a triode field emission device using a carbon nanotube, and improve the concentration of electron beams. In particular, if the triode field emission device of the present invention is applied to a field emission display (FED), it is possible to achieve a low-level operation voltage as well as large area display, which is one of the aims of carbon nanotube materials. In addition, it is possible to minimize power consumption, because little leakage current is generated, and the high concentration of electron beams can embody excellent display.

While the present invention has been described with respect to certain preferred embodiments, it will be apparent to those skilled in the art that various changes and modifications may be made without departing from the scope of the invention as defined in the following claims.

What is claimed is:

1. A triode field emission device using a carbon nanotube, comprising:
    a bottom electrode formed on an insulation substrate;
    an array of carbon nanotube mixture formed on the bottom electrode;
    an insulating mesh gate plate having a plurality of openings corresponding to the locations of the carbon nanotube mixture, the upper part of the openings being smaller than the lower part;
    an extraction electrode formed on the insulating mesh gate plate;
    a top electrode formed apart from the extraction electrode with a predetermined space in between; and
    a first spacer formed between the extraction electrode and the top electrode.

2. The triode field emission device as recited in claim 1, further comprising a first auxiliary electrode formed in the lower part of the insulating mesh gate plate.

3. The triode field emission device as recited in claim 2, further including a second auxiliary electrode formed on the side of the openings of the insulating mesh gate plate.

4. The triode field emission device as recited in claim 3, wherein the second auxiliary electrode is provided to a part of the lower part of the opening.

5. The triode field emission device as recited in claim 3, wherein the voltage applied to the first and second auxiliary electrodes is the same as the voltage applied to the lower electrode.

6. The triode field emission device as recited in claim 2, further including a second spacer formed in the lower part of the insulating mesh gate plate to space out the bottom electrode and the first auxiliary electrode.

7. A field emission display, comprising:
    an insulation substrate;
    a bottom electrode formed on the insulation substrate;
    an array of carbon nanotube mixture provided on top of the bottom electrode;
    an insulating mesh gate plate having a plurality of openings corresponding to the locations of the carbon nanotube mixture, the upper part of the openings being smaller than the lower part;
    an extraction electrode formed on the insulating mesh gate plate;
    a top electrode formed apart from the extraction electrode with a predetermined space in between; and
    a spacer formed between the extraction electrode and the top electrode;
    a fluorescent substance provided to the surface of the top electrode; and
    a transparent substrate provided to the upper part of the top electrode.

* * * * *